United States Patent [19]
Ito et al.

[11] Patent Number: 4,706,113
[45] Date of Patent: Nov. 10, 1987

[54] CONTOUR DETECTING FILTER DEVICE USING PAL SAMPLES OF COMPOSITE VIDEO SIGNALS WITHOUT SEPARATION OF LUMINANCE SIGNALS THEREFROM

[75] Inventors: Hiroshi Ito; Yoshiki Mizutani, both of Nagaokakyo, Japan

[73] Assignee: Mitsubishi Denki Kabushiki Kaisha, Tokyo, Japan

[21] Appl. No.: 826,916

[22] Filed: Feb. 6, 1986

[30] Foreign Application Priority Data

| Feb. 18, 1985 | [JP] | Japan | 60-31129 |
| Feb. 26, 1985 | [JP] | Japan | 60-37088 |
| Mar. 7, 1985 | [JP] | Japan | 60-45206 |
| Mar. 25, 1985 | [JP] | Japan | 60-62486 |

[51] Int. Cl.[4] .......................................... H04N 5/208
[52] U.S. Cl. ...................................... 358/37; 358/166
[58] Field of Search ................... 358/37, 21 R, 13, 166

[56] References Cited

U.S. PATENT DOCUMENTS

| 3,732,360 | 5/1973 | Breimer et al. | 358/37 |
| 4,368,483 | 1/1983 | Liu | 358/37 |
| 4,377,820 | 3/1983 | Reitmeier | 358/21 R |
| 4,381,519 | 4/1983 | Wilkinson et al. | 358/21 R |

FOREIGN PATENT DOCUMENTS

| 77010 | 4/1983 | European Pat. Off. |
| 3244808 | 6/1983 | Fed. Rep. of Germany |
| 3427669 | 2/1985 | Fed. Rep. of Germany |
| 3431262 | 3/1985 | Fed. Rep. of Germany |
| 3431200 | 3/1985 | Fed. Rep. of Germany |
| 2162402 | 1/1986 | United Kingdom |

Primary Examiner—John W. Shepperd
Attorney, Agent, or Firm—Lowe Price LeBlanc Becker & Shur

[57] ABSTRACT

A contour detecting filter device samples composite video signals of the PAL system by sampling signals at a frequency four times the chrominance subcarrier frequency thereof through an A-D converter (2), to input sampling value series thus sampled in a delay circuit group (81–84). Detected from the delay circuit group are four sampling values (P1, P2, P4, P5) which are point-symmetrically positioned around a noted sampling value (P3) on the screen and having the same-phased chrominance subcarriers. The noted sampling value and the four sampling values are employed to perform arithmetic on second order differentiations in the direction of horizontal scanning lines and in the vertical direction on the screen by a coefficient multiplier (85), an adder (86) and a multiplier (87), thereby to detect the contour signal of the noted sampling value. Therefore, it is not necessary to separate luminance signals from the composite video signals, from which the contour signals can be directly detected.

7 Claims, 8 Drawing Figures

CONTOUR DETECTING FILTER DEVICE USING PAL SAMPLES OF COMPOSITE VIDEO SIGNALS WITHOUT SEPARATION OF LUMINANCE SIGNALS THEREFROM

BACKGROUND OF THE INVENTION

1. Field of the Invention

The present invention relates to a contour detecting filter device. More specifically, it relates to a contour detecting filter device for digitally detecting contour signals from composite video signals of the PAL system including frequency-multiplexed luminance signals and chrominance signals.

2. Description of the Prior Art

Various systems have been proposed in the art for detecting contour signals from video data. In television receivers, for example, contour signals are detected from luminance signals to be added to the original luminance signals, thereby to improve sharpness of pictorial images.

A composite video signal $S(t)$ of the PAL system is composed of a luminance signal $Y(t)$ and a chrominance signal $C(t)$ which is obtained by quadrature phase modulation of two color-difference signals $U(t)$ and $V(t)$ at the chrominance subcarrier frequency $f_{sc}$ (4.43361875 MHz). Namely, the composite video signal $S(t)$ is expressed as follows:

$$S(t) = Y(t) + C(t)$$
$$= Y(t) + U(t)\sin 2\pi f_{sc}T \pm V(t)\cos 2\pi f_{sc}T$$

where the sign for $V(t)$ is changed between "+" and "−" per scanning line.

In such a conventional contour detecting filter of the analog or digital type, for example, the aforementioned luminance signal $Y(t)$ has generally been separated from the composite video signal $S(t)$ so as to obtain a horizontal contour signal through a horizontal contour detecting filter and a vertical contour signal through a vertical contour detecting filter with respect to the separated luminance signal $Y(t)$. Description is now made on the horizontal and vertical contour detecting filters.

FIG. 1 shows an example of a conventional horizontal contour detecting filter of the digital system. Referring to FIG. 1, analog composite video signals are supplied from an input terminal 1 to an A-D conversion circuit 2. The A-D conversion circuit 2 is adapted to convert the analog signals into digital signals, thereby to supply the converted digital signals to a luminance/chrominance signal separation circuit 3 which separates the same into luminance signals and chrominance signals. The luminance signals separated by the luminance/chrominance signal separation circuit 3 are supplied to a horizontal contour detecting filter 5. The horizontal contour detecting filter 5 is formed by a first delay circuit 51, a second delay circuit 52, a coefficient multiplier 53 and an adder 54. Contour signals detected by the horizontal contour detecting filter 5 are outputted at an output terminal 4.

Description is now made on the operation of the horizontal contour detecting filter 5 as shown in FIG. 1. The analog composite video signals received in the input terminal 1 are supplied to the A-D conversion circuit 2. The A-D conversion circuit 2 converts the analog composite video signals into digital composite video signals by sampling signals of a predetermined sampling frequency $f_s$. The digital composite video signals outputted from the A-D conversion circuit 2 are separated into luminance signals and chrominance signals by the luminance/chrominance signal separation circuit 3. The luminance signals separated by the luminance/chrominance signal separation circuit 3 are supplied to the first delay circuit 51 as well as to the adder 54 of the horizontal contour detecting filter 5. Outputs from the first delay circuit 51 are supplied to the second delay circuit 52 as well as to the coefficient multiplier 53. The coefficient multiplier 53 is adapted to multiply the output signals from the first delay circuit 51 by −2. The delay times of the first and second delay circuits 51 and 52 are set at the inverse number of the aforementioned sampling frequency $f_s$, to be one sampling period T of digital signal series outputted from the A-D conversion circuit 2.

The adder 54 is adapted to add up the outputs from the luminance/chrominance signal separation circuit 3, the coefficient multiplier 53 and the second delay circuit 52. Therefore, assuming that a luminance signal $f(t)$ outputted from the luminance/chrominance signal separation circuit 3 is $f(nT)$ at a time $t = nT$, the output from the adder 54 is expressed as follows, as understood from the above description:

$$f(nT) - 2f(n-1)T + f[(n-2)T]$$

This is expressive of the second order differentiation with respect to the horizontal direction of the aforementioned luminance signal $f(t)$ on the screen, whereby detected is the horizontal high-frequency component of the luminance signal, i.e., the horizontal contour signal.

FIG. 2 shows an example of a conventional vertical contour detecting filter of the digital system. Referring to FIG. 2, a vertical contour detecting filter 6 is formed by third and fourth delay circuits 61 and 62, a coefficient multiplier 63 and an adder 64. An A-D conversion circuit 2 and a luminance/chrominance signal separation circuit 3 are identical to those in FIG. 1. Each of the third and fourth delay circuits 61 and 62 is formed to have a delay time of one horizontal scanning interval while the coefficient multiplier 63 multiplies outputs from the third delay circuit 61 by −2 and the adder 64 adds up the outputs from the luminance/chrominance signal separation circuit 3, the coefficient multiplier 63 and the fourth delay circuit 62 similarly to those in FIG. 1. Therefore, as obvious from the above description with reference to FIG. 1, an output from the adder 64 of the vertical contour detecting filter 6 as shown in FIG. 2 is expressed as follows:

$$f(nT) - 2f(nT-H) = f(nT-2H)$$

Thus, performed with respect to the luminance signal outputted from the luminance/chrominance signal separation circuit 3 is the second order differentiation in the vertical direction on the screen, whereby detected is the vertical high-frequency component of the luminance signal, i.e., the vertical contour signal.

FIG. 3 shows a conventional contour detecting filter which is formed by combining the horizontal and vertical contour detecting filters as shown in FIGS. 1 and 2. A contour detecting filter 7 as shown in FIG. 3 is adapted to detect horizontal and vertical contour signals, and first and second delay circuits 72 and 73 are identical in delay time to the first and second delay circuits 51 and 52 as hereinabove described with reference to FIG. 1. Fifth and sixth delay circuits 71 and 74 are in delay times obtained by subtracting the delay times of the first and second delay circuits 72 and 73 from one horizontal scanning interval respectively. Thus, in total, the first and fifth delay circuits 72 and 71 are in a delay time for one horizontal scanning interval H while the second and sixth delay circuits 73 and 74 are also in a delay time for one horizontal scanning interval H in total.

A coefficient multiplier 75 is adapted to multiply its input signals by −4, while an adder 76 is adapted to add up outputs from a luminance/chrominance signal separation circuit 3, the fifth delay circuit 71, the coefficient multiplier 75, the second delay circuit 73 and the sixth delay circuit 74.

In other words, the contour detecting filter 7 consists of a vertical contour detecting filter which is formed by the fifth, first, second and sixth delay circuits 71, 72, 73 and 74, the coefficient multiplier 75 and the adder 76 and a horizontal contour detecting filter which is formed by the first and second delay circuits 72 and 73, the coefficient multiplier 75 and the adder 76, thereby to detect vertical and horizontal contour signals. Further, such structure as shown in FIG. 3 can be considered to perform arithmetic on the second order differentiation in the oblique direction, whereby oblique contour signals can also be detected as hereinafter described in detail.

FIG. 4 is a block diagram showing definite structure of the luminance/chrominance signal separation circuit as shown in FIGS. 1 to 3. As shown in FIG. 4, the luminance/chrominance signal separation circuit 3 is formed by a line memory 30, a vertical high-pass filter 31, a horizontal high-pass filter 32, a delay circuit 33 and a subtractor 34. The line memory 30 includes delay circuits 301 and 302 for delaying signals from an A-D conversion circuit 2 by one horizontal scanning interval H to output the same. The line memory 30 receives the signals from the A-D conversion circuit 2 thereby to generate three types of signals including non-delayed signals, the signals delayed by 1H through the delay circuit 301 and those delayed by 2H through the delay circuits 301 and 302. The vertical high-pass filter 301 receives the signals in the three types of delay times from the line memory 30 to detect high-frequency components in the vertical direction on the screen to supply the same to the horizontal high-pass filter 32. Therefore, the vertical high-pass filter 31 includes a −¼ multiplier 311 which receives the non-delayed signals from the line memory 30 to multiply the same by −¼ and output the same, a ½ multiplier 312 which receives the 1H delay signals from the line memory 30 to multiply the same by ½ and output the same, another −¼ multiplier 313 which multiplies the 2H delay signals received from the line memory 30 by −¼ to output the same and an adder 314 which adds up the signals from the −¼ multipliers 311 and 313 and the ½ multipliers 312 to supply the result to the horizontal high-pass filter 32.

The horizontal high-pass filter 32 receives the signals from the vertical high-pass filter 31 to detect horizontal high-frequency components, thereby to separate chrominance signals and supply the same to one input terminal of the subtractor 34. Therefore, the horizontal high-pass filter 32 is formed by a delay circuit 321 which delays the signals from the vertical high-pass filter 31 by 2T, a delay circuit 322 which delays the signals from the vertical high-pass filter 31 further by 2T, a delay circuit 322 which delays the signals from the delay circuit 321 further by 2T, a −¼ multiplier 323 which multiplies the signals from the vertical high-pass filter 31 by −¼ to output the same, a ½ multiplier 324 which multiplies the signals from the delay circuit 321 by ½ to output the same, a −¼ multiplier 325 which multiplies the signals from the delay circuit 322 by −¼ to output the same and an adder 326 which adds up the signals received from the −¼ multipliers 323 and 325 and the ½ multiplier 324 to output the result.

With reference to FIG. 4, description is now briefly made on the operation of the luminance/chrominance signal separation circuit 3. Operations of the respective filters 31 and 32 and the line memory 30 are hereinafter described in detail. The output signals from the A-D conversion circuit 2 are sequentially detected by the line memory 30 as three signals having the cycle of one horizontal scanning interval H. The vertical high-pass filter 31 receives the output signals from the line memory 30 to detect the high-frequency components in the vertical direction on the screen. The horizontal high-pass filter 32 which is cascade-connected to the vertical high-pass filter 31 detects the high-frequency components in the direction of the horizontal scanning lines to separate the chrominance signals and supply the same to the subtractor 34.

On the other hand, the output signals from the first stage delay circuit 301 of the line memory 30 are delayed by the delay circuit 33 by a period 2 T, which is twice the sampling period T, to be supplied to the subtractor 34. The subtractor 34 subtracts the output signals of the horizontal high-pass filter 32 from the output signals of the delay circuit 33 thereby to obtain luminance signals, which in turn are outputted to the contour detecting filter.

As hereinabove described, the conventional contour detecting filter device detects the contour signals by utilizing only the luminance signal components. Therefore, the delay circuits required for the luminance/chrominance separation circuit 3 for separating the composite video signals into the luminance signals and the chrominance signals cannot be commonly used with the delay circuits required for the horizontal and vertical contour detecting filters, whereby the components are increased in number with inevitable increase in cost.

SUMMARY OF THE INVENTION

Accordingly, the principal object of the present invention is to provide a contour detecting filter device which uses delay circuits required for a luminance/chrominance signal separation circuit commonly with those required for contour detecting filters, thereby to directly detect contour signals from composite video signals.

Briefly stated, a contour detecting filter device according to the present invention samples composite video signals of the PAL system by sampling signals at a frequency integral times the chrominance subcarrier frequency thereof to obtain sampling values having the same-phased chrominance subcarriers per four horizontal scanning lines on the screen, which sampling values are delayed by a period obtained by subtracting two sampling periods from one horizontal scanning interval to output second delay signals. The second delay signals are delayed by two sampling periods to output third delay signals, which in turn are delayed by two sampling periods to output fourth delay signals. The fourth delay signals are delayed by a period obtained by subtracting two sampling periods from one horizontal scanning interval to output fifth delay signals, which in turn are delayed by one horizontal scanning interval to output sixth delay signals. Contour signals in the direction of horizontal scanning lines and those in the vertical direction on the screen are detected on the basis of the first, third and fifth delay signals to compare the absolute differential value between the second and fourth delay signals and between the original sampling values and the sixth delay signals, thereby to select either a horizontal contour detecting filter or a vertical contour detecting filter in response to the result of the comparison.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
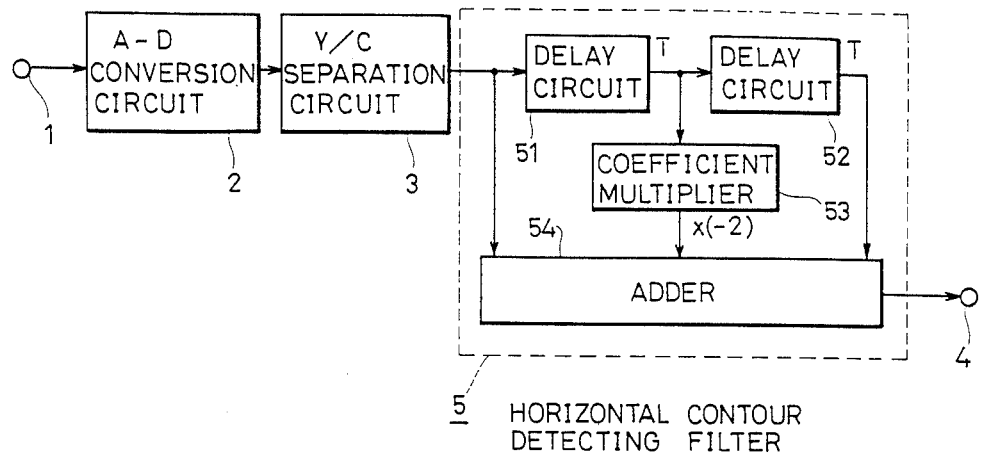
FIG. 1 is a block diagram showing a conventional horizontal contour detecting filter.
Figure 2:
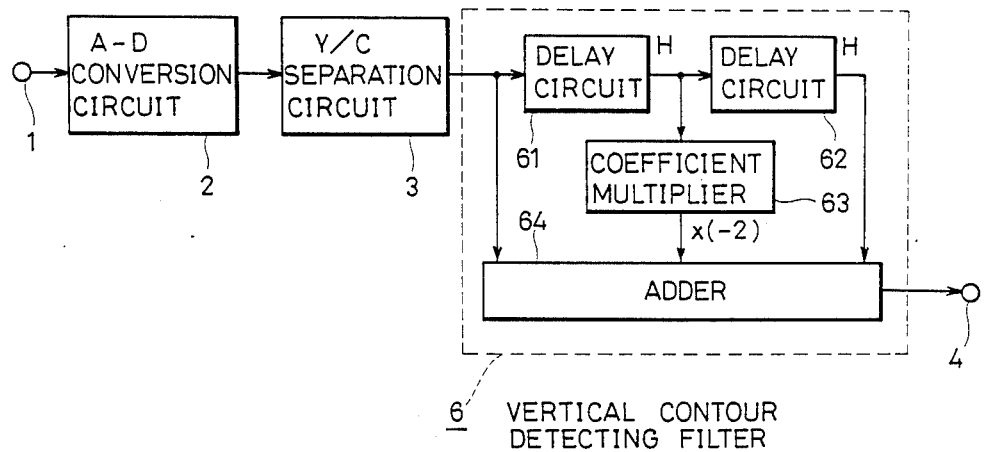
FIG. 2 is a block diagram showing a conventional vertical contour detecting filter.
Figure 3:
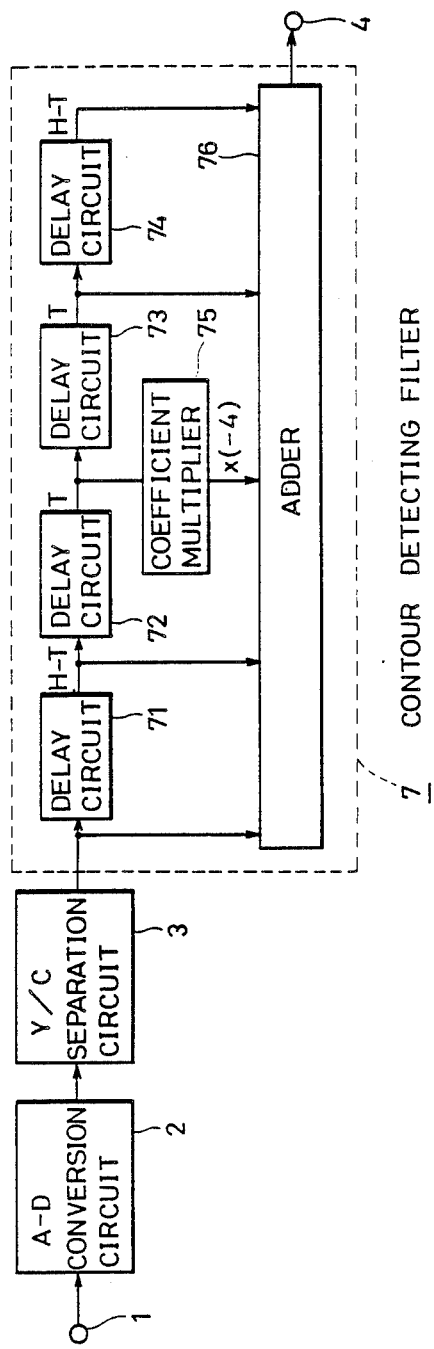
FIG. 3 is a block diagram showing a conventional horizontal/vertical contour detecting filter.
Figure 4:
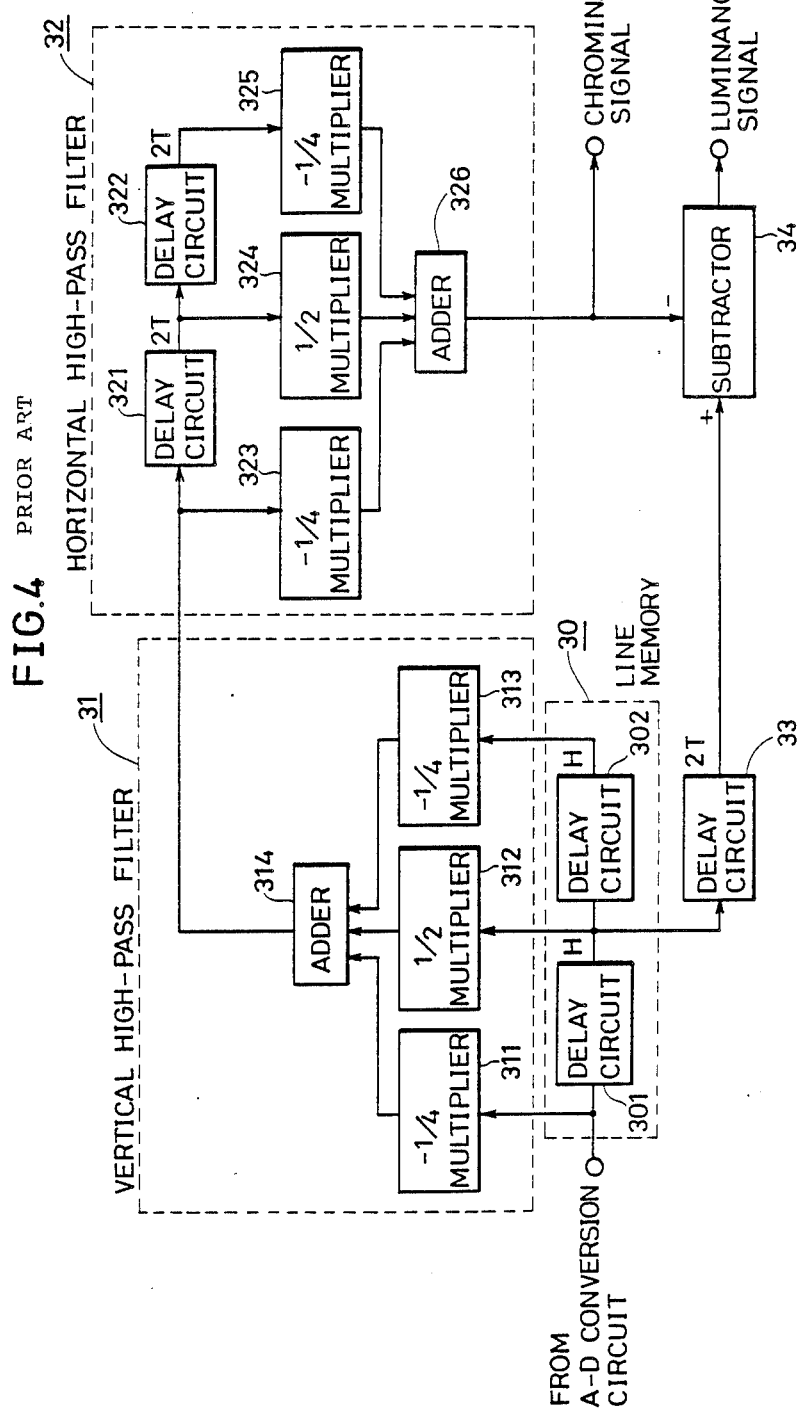
FIG. 4 is a block diagram showing definite structure of a luminance/chrominance signal separation circuit as shown in FIGS. 1 to 3.
Figure 5:
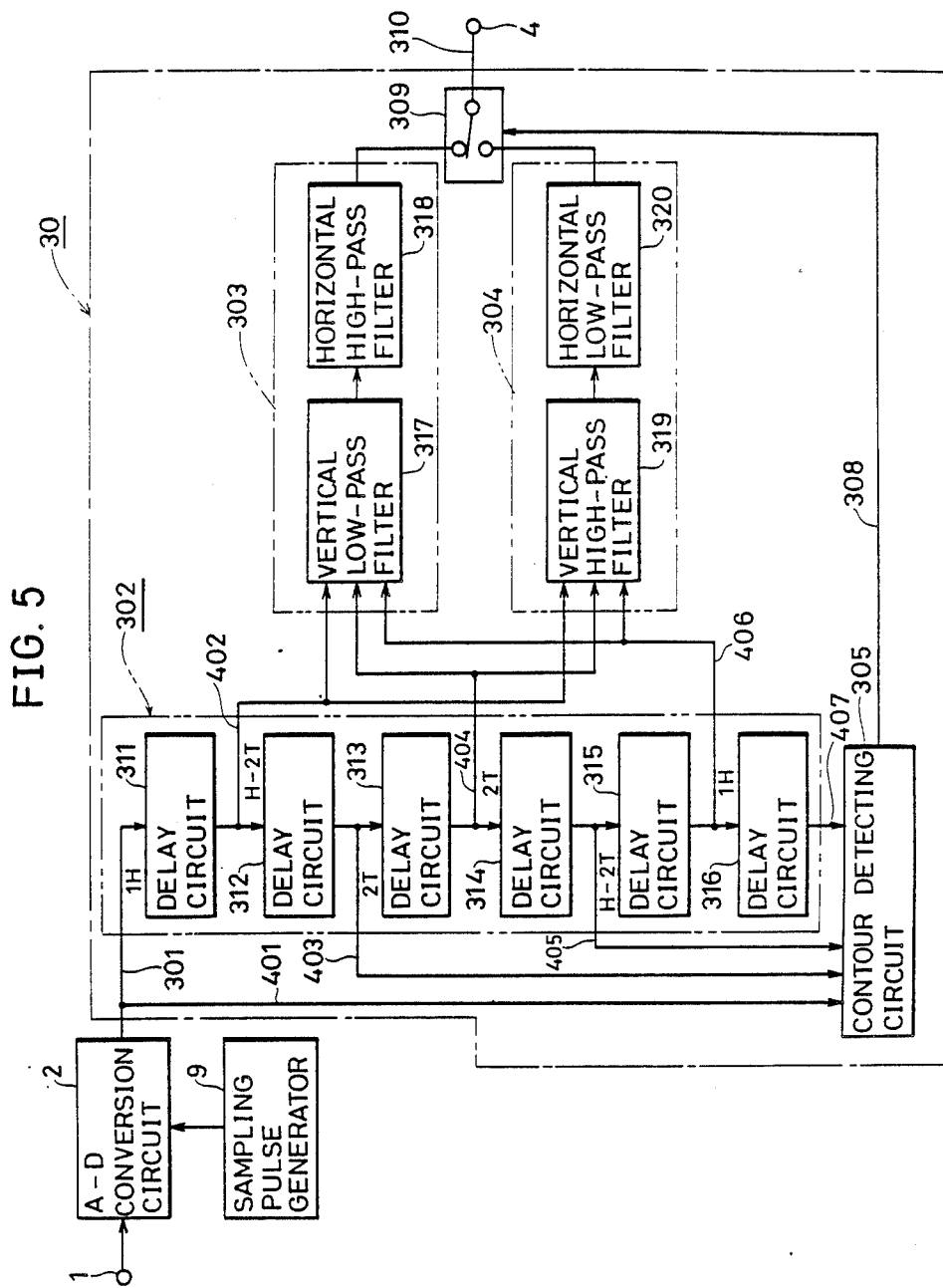
FIG. 5 is a block diagram showing an embodiment of the present invention.

FIG. 5 is a block diagram showing an embodiment of the present invention. An A-D conversion circuit 2 is connected with a sampling pulse generator 9 for supplying sampling pulses as shown in FIG. 5. A contour detecting filter 30 is formed by a line memory 302, a horizontal contour detecting filter 303, a vertical contour detecting filter 304, a contour detecting circuit 305 and a switching circuit 309. The line memory 302 includes delay circuits 311 and 316 for delaying signals by one horizontal scanning interval (H), delay circuits 312 and 315 for delaying signals by a period (H−2T) obtained by subtracting two sampling periods from one horizontal scanning interval, delay circuits 313 and 314 for delaying signals by two sampling periods 2 T and signal lines 401 to 407 for outputting the signals from the respective delay circuits 311 to 316. The horizontal contour detecting filter 303 includes a vertical low-pass filter 317 and a horizontal high-pass filter 318, while the vertical contour detecting filter 304 includes a vertical high-pass filter 319 and a horizontal low-pass filter 320.

Figure 6:
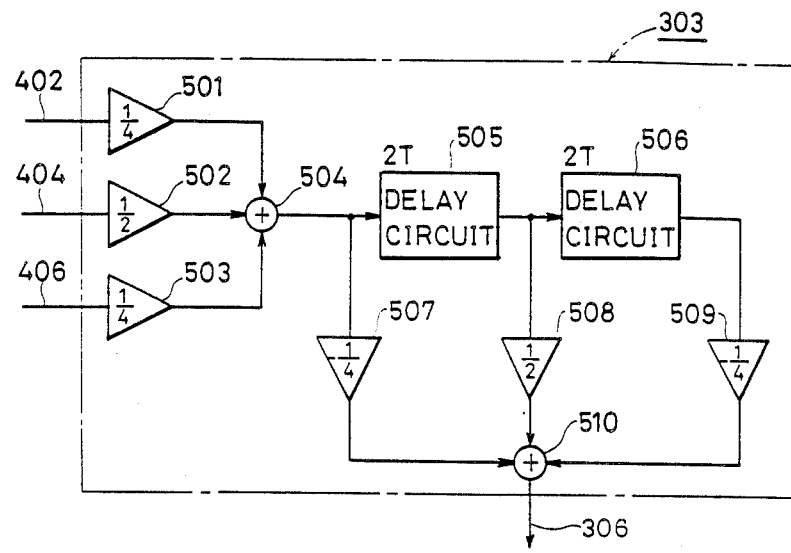
FIG. 6 is a detailed block diagram of a horizontal contour detecting filter as shown in FIG. 5.

FIG. 6 is a detailed block diagram of the horizontal contour detecting filter 303. Referring to FIG. 6, the horizontal contour detecting filter 303 is formed by $\frac{1}{4}$ multipliers 501 and 503, $\frac{1}{2}$ multipliers 502 and 508, adders 504 and 510, delay circuits 505 and 506 respectively having delay times of two sampling periods 2T, $-\frac{1}{4}$ multipliers 507 and 509 and a signal line 306 for outputting horizontal contour signals.

Figure 7:
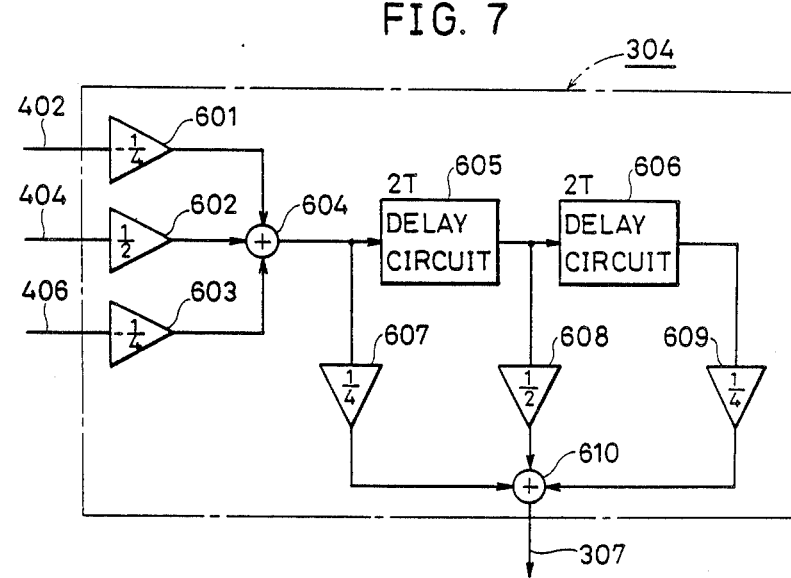
FIG. 7 is a detailed block diagram of a vertical contour detecting filter as shown in FIG. 5.

FIG. 7 is a detailed block diagram showing the vertical contour detecting filter 304 as shown in FIG. 5.

Referring to FIG. 7, the vertical contour detecting filter 304 is formed by $-\frac{1}{4}$ multipliers 601 and 603, $\frac{1}{2}$ multipliers 602 and 608, adders 604 and 610, delay circuits 605 and 606 respectively having delay times for two sampling periods 2T, $\frac{1}{4}$ multipliers 607 and 609 and a signal line 307 for outputting vertical contour signals.

Figure 8:
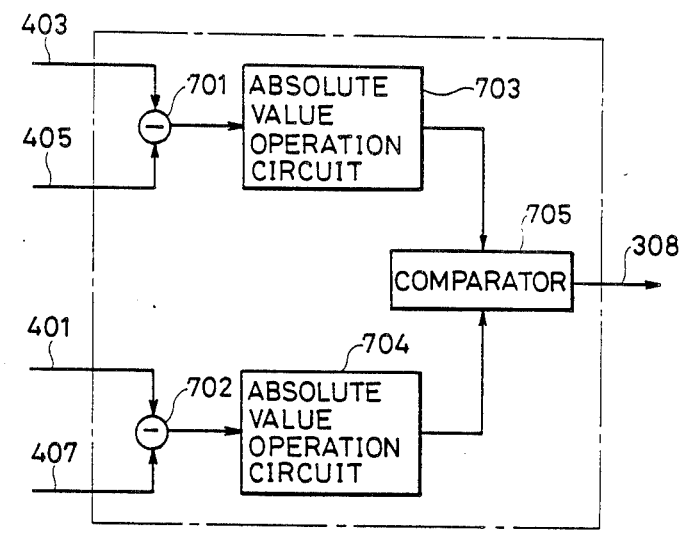
FIG. 8 is a detailed block diagram showing a contour detecting circuit as shown in FIG. 5.

FIG. 8 is a detailed block diagram of the contour detecting circuit 305 as shown in FIG. 5. Referring to FIG. 8, the contour detecting circuit 305 is formed by subtractors 701 and 702, absolute value operation circuits 703 and 704, a comparator 705 and a signal line 308 for outputting control signals.

With reference to FIGS. 5 to 8, description is now made on the definite operation of this embodiment. The line memory 302 simultaneously outputs sampling values of required sampling points from digital signals supplied from the A-D conversion circuit 2 to the signal line 301. Namely, the digital signals received by the line memory 302 are supplied to the contour detecting circuit 305 through the output line 401 absolutely with no delay, while being sequentially delayed by the delay circuits 311 to 316. The signals thus delayed by the respective delay circuits 311 to 316 are outputted through the signal lines 402 to 407. Assuming that symbol T indicates the sampling period and symbol H indicates the horizontal scanning interval and symbol f(nT) (n=0, 1, 2, ... ) indicates the signal value series outputted through the signal line 403, the signal line 403 outputs signal series sampled in a delay by two sampling periods therefrom, which signal series is expressed as f(nT+2T).

The signal line 402 outputs signal series sampled further in a delay by a period H−2T, which series is expressed as f(nT+H) and the non-delayed signal value series outputted from the signal line 401 is expressed as f(nT +2H).

In a similar manner, the signal lines 405, 406 and 407 output signal value series f(nT−2T), f(nT−H) and f(nT−2H) respectively. With reference to the signal series f(nT) on the screen, the signal series f(nT+2T) and f(nT−2T) are positioned in the right and left-hand directions thereof and the signal series f(nT+H) and f(nT+2H) are positioned under the same while the signal series f(nT−H) and f(nT−2H) are positioned above the same.

In the horizontal contour detecting filter 303 as shown in FIG. 6, the signal value series f(nT +H) outputted through the signal line 402 is multiplied by $\frac{1}{4}$ by the coefficient multiplier 501, to be supplied to the first input of the adder 504. The signal value series f(nT) outputted through the signal line 404 is multiplied by $\frac{1}{2}$ by the coefficient multiplier 502, to be supplied to the second input of the adder 504. Further, the signal value series f(nT−H) outputted through the signal line 406 is multiplied by $\frac{1}{4}$ by the coefficient multiplier 503, to be supplied to the third input of the adder 504. The adder 504 adds up all of the aforementioned three system inputs, and the output g(nT) therefrom is expressed as follows:

$$g(nT) = \tfrac{1}{4}[f(nT+H) + 2f(nT) + f(nT-H)]$$

In view of the vertical frequency $f_{ver}$, this is a vertical low-pass filter in which $f_{ver}=0$ and the gain is 1, while the gain is 0 at $f_{ver}=156.25$ (c/ph). Chrominance signal components of the PAL system are distributed around $f_{ver}=78.125$ (c/ph) and $f_{ver}=234.375$ (c/ph), and hence the chrominance signal components are reduced by the aforementioned contour detecting filter. Thus, the output g(nT) is obtained by mainly detecting vertical low-frequency components of the luminance signals of f(nT) with no restriction on the horizontal frequency, and hence the said output includes horizontal contour components.

The outputs from the adder 504 are supplied to the 2 T delay circuit 505 and the $-\frac{1}{4}$ multiplier 507. Assuming that the adder 504 outputs signal value series g(nT+2T), the delay circuit 505 outputs signal value series g(nT). The delay circuit 506 delays the said signal value series further by 2T, thereby to output signal value series g(nT−2T). The coefficient multiplier 507 multiplies g(nT+2T) by $-\frac{1}{4}$ to supply the same to the adder 510 and the coefficient multiplier 508 multiplies g(nT) by $\frac{1}{2}$ to supply the same to the adder 510, while the coefficient multiplier 509 multiplies g(nT−2T) by $-\frac{1}{4}$ to supply the same to the adder 510. The adder 510 calculates the total of the aforementioned inputs to output the following signal value series x(nT):

$$x(nT) = -\tfrac{1}{4}[g(nT+2T) - 2g(nT) + g(nT-2T)]$$

This is a high-pass filter in which the gain is 0 at f=0(Hz) while the gain is 1 at f=$f_{sc}$ ($f_{sc}$: chrominance subcarrier frequency). Thus, x(nT) represents horizontal contour components, and this signal is outputted through the output signal line 306 of the horizontal contour detecting filter 303.

Description is now made on the operation of the vertical contour detecting filter 304. Referring to FIG. 7, the output signal h(nT) from the adder 604 can be expressed as follows, similarly to the above description:

$$h(nT) = -\tfrac{1}{4}[f(nT+H) - 2f(nT) + f(nT-H)]$$

In view of the vertical frequency, this is a vertical high-pass filter in which the gain is 0 at $f_{ver}=0$ and 1 at $f_{ver}=156.25$ (c/ph). Thus, the signal value series h(nT) includes vertical contour components, as well as reduced chrominance signal components. The said chrominance signal components are substantially eliminated by the low-pass filter formed by the delay circuits 605 and 606, the coefficient multipliers 607 to 609 and the adder 610, leaving only the vertical contour components. Namely, the signal value series outputted from the adder 610 can be expressed as follows, similarly to the above description:
y(nT)=$\tfrac{1}{4}$[h(nT+2T)+2h(nT)+h(nT−2T)]

This is a low-pass filter in which the gain is 1 at f=0 (Hz) and 0 at f=$f_{sc}$, which low-pass filter eliminates the chrominance signal components included in the signal value series h(nT). The vertical contour components y(nT) are outputted through the output signal line 307 of the vertical contour detecting filter 304.

In this embodiment, the horizontal and vertical contour signals detected by the aforementioned means are not directly superposed to form horizontal/vertical contour signals, but either the horizontal contour signals or the vertical contour signals are appropriately selected in response to features of pictorial images to be outputted. In concrete terms, the features of the pictorial images reside in whether the contours are in the horizontal direction of in the vertical direction. FIG. 8 shows the circuit for detecting the direction of the contours.

Referring to FIG. 8, the signal value series f(nT+2H) outputted through the signal line 401 and the signal value series f(nT−2H) outputted through the signal line 407 are respectively supplied to the subtractor 702. Outputs from the subtractor 702 are supplied to the absolute value operation circuit 704, which in turn obtains the absolute value of the signals. Thus, the output from the absolute value operation circuit 704 is expressed as follows:

$$|f(nT+2H) - f(nT-2H)|$$

On the other hand, the signal value series f(nT+2T) outputted through the signal line 403 and the signal value series f(nT−2T) outputted through the signal line 405 are respectively supplied to the subtractor 701. The absolute value operation circuit 703 obtains the absolute value of the output from the subtractor 701, and hence the output from the absolute value operation circuit 703 is expressed as follows:

$$|f(nT+2T) - f(nT-2T)|$$

With reference to f(nT) in the outputs from the absolute value operation circuit 704, f(nT+2H) is the signal value series after two horizontal scanning intervals, which is positioned downwardly by two scanning lines on the screen. Further, f(nT−2H) is the signal value series two horizontal scanning intervals forward, which is positioned upwardly by two scanning lines on the screen. The chrominance subcarriers are phase-inverted per two scanning lines, and hence, if no vertical change is caused in the pictorial images, f(nT+2H) is equal to f(nT−2H) and the absolute value operation circuit 704 outputs zero. Namely, the outputs of the absolute value operation circuit 704 indicates the degree of vertical changes in the pictorial images.

Similarly, with reference to f(nT) in the outputs from the absolute value operation circuit 703, f(nT+2T) is signal value series delayed by two samples and positioned in the right-hand direction on the screen and f(nT−2T) is signal value series two samples forward and positioned in the left-hand direction on the screen. The sampling frequency is $4f_{sc}$ in this case, and hence, if no horizontal change is caused in the pictorial images, the phases of the chrominance subcarriers return to original states every four sampling points. Therefore, f(nT+2T) is equal to f(nT−2T), and the absolute value operation circuit 703 outputs zero. Namely, the outputs from the absolute value operation circuit 703 represent the degree of horizontal changes in the pictorial images.

The comparator 705 compares the output signals from the aforementioned two absolute value operation circuits 703 and 704 so as to control the switching circuit 309 through the signal line 308 to supply the outputs from the vertical contour detecting filter 304 as contour signals to the signal line 310 when vertical signal difference is greater than horizontal signal difference while supplying the outputs from the horizontal contour detecting filter 303 as contour signals to the signal line 310 when the former is smaller than the latter.

The chrominance signal components slightly leaking into the horizontal contour signals can be eliminated by the aforementioned output control, for the following reasons: The chrominance signal components leaking into the horizontal contour signals occupy regions in which the vertical frequency is relatively high and the horizontal frequency is approximate to $f_{sc}$. However, when the horizontal frequency approaches to $f_{sc}$, horizontal signal difference is substantially equalized to zero, and the outputs of the vertical contour detecting filter 304 are selected with respect to the signals having the aforementioned frequency components, which are not outputted as the contour signals. Thus, the chrominance signal components which cannot be eliminated through the horizontal contour detecting filter 303 can be completely removed by the output switching control.

Thus, according to this embodiment, the horizontal/vertical contour signals can be directly detected from the composite video signals, and hence the luminance/chrominance signal separation circuit for separating the luminance and chrominance signals from the composite video signals can be commonly used with delay circuits. Further, the horizontal contour detecting filter and the vertical contour detecting filter are switched in response to the features of the pictorial images, thereby to obtain contour signals with reduced leakage of the chrominance signal components.

Also in this embodiment, the sampling pulse frequency is not restricted to $4f_{sc}$.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A contour detecting filter device comprising:
   A-D conversion means (2) for sampling composite video signals of the PAL system at a frequency integral times the chrominance subcarrier frequency thereof to obtain sampling values having the same-phased chrominance subcarriers per four horizontal scanning lines in the vertical direction on the screen;
   first delay means (311) for delaying output signals from said A-D conversion means (2) by one horizontal scanning interval;
   second delay means (312) for delaying output signals from said first delay means (311) by a period obtained by subtracting two sampling periods from one horizontal scanning interval;
   third delay means (313) for delaying output signals from said second delay means by two sampling periods;
   fourth delay means (314) for delaying output signals from said third delay means by two sampling periods;
   fifth delay means (315) for delaying output signals from said fourth delay means by a period obtained by subtracting two sampling periods from one horizontal scanning interval;
   sixth delay means (316) for delaying output signals from said fifth delay means by one horizontal scanning interval;
   a horizontal contour detecting filter (303) for detecting contour signals in the horizontal scanning direction from said composite video signals on the basis of said output signals from respective said first, third and fifth delay means (311, 313, 315);
   a vertical contour detecting filter (304) for detecting contour signals in the vertical direction on the screen from said composite video signals on the basis of said output signals from respective said first, third and fifth delay means (311, 313, 315);
   comparator means (705) for comparing first absolute differential value (703) between said output signals from respective said second and fourth delay means (312, 314) with second absolute differential value (704) between said output signals from said A-D conversion means (2) and said sixth delay means (316); and
   selection means (309) for selecting said output signals from either said horizontal contour detecting filter (303) or said vertical contour detecting filter (304) in response to the result of comparison by said comparator means (705).

2. A contour detecting filter device in accordance with claim 1, wherein
   said horizontal contour detecting filter (303) includes:
   a vertical low-pass filter (317) for detecting low-frequency components in the vertical direction on the screen, and
   a high-pass filter (318) for detecting high-frequency components from output signals from said vertical low-pass filter (317).

3. A contour detecting filter device in accordance with claim 1, wherein
   said vertical contour detecting filter (304) includes:
   a vertical high-pass filter (319) for detecting high-frequency components in the vertical direction on the screen, and
   a horizontal low-pass filter (320) for detecting low-frequency components from output signals from said vertical high-pass filter (319).

4. A contour detecting filter device in accordance with claim 2, wherein
   said vertical low-pass filter (317) includes first adder means (504) for adding up values obtained by multiplying said output signals from said first delay means (311) by $\frac{1}{4}$ (501), values obtained by multiplying said output signals from said third delay means (313) by $\frac{1}{2}$ (502) and values obtained by multiplying said output signals from said fifth delay means (315) by $\frac{1}{4}$ (503).

5. A contour detecting filter device in accordance with claim 2, wherein
   said high-pass filter (318) includes:
   seventh delay means (505) for delaying output signals from said vertical low-pass filter (317) by two sampling periods,
   eighth delay means (506) for delaying output signals from said seventh delay means (505) by two sampling periods, and
   second adder means (510) for adding up values obtained by multiplying output signals from said vertical low-pass filter (317) by $-\frac{1}{4}$ (507), values obtained by multiplying output signals from said seventh delay means by $\frac{1}{2}$ (508) and values obtained by multiplying output signals from said eighth delay means (506) by $-\frac{1}{4}$ (509).

6. A contour detecting filter device in accordance with claim 3, wherein
   said vertical high-pass filter (319) includes third adder means (604) for adding up values obtained by multiplying output signals from said first delay means (311) by $-\frac{1}{4}$ (601), values obtained by multiplying output signals from said third delay means (313) by $\frac{1}{2}$ (602) and values obtained by multiplying output signals from said fifth delay means (315) by $-\frac{1}{4}$ (603).

7. A contour detecting filter device in accordance with claim 3, wherein said horizontal low-pass filter (302) includes: ninth delay means (605) for delaying output signals from said vertical high-pass filter (319) by two sampling periods,
tenth delay means for delaying output signals from said ninth delay means (605) by two sampling periods, and
fourth adder means (610) for adding up values obtained by multiplying output signals from said vertical high-pass filter (319) by $\frac{1}{4}$ (607), values obtained by multiplying output signals from said ninth delay means (605) by $\frac{1}{2}$ (608) and values obtained by multiplying output signals from said tenth delay means (606) by $\frac{1}{4}$ (609).

* * * * *